United States Patent [19]

Braswell

[11] Patent Number: 4,477,542

[45] Date of Patent: Oct. 16, 1984

[54] QUICK RELEASE STORAGE BATTERY CLOSURE ASSEMBLY

[76] Inventor: Richard R. Braswell, 3154 Studebaker Rd., Long Beach, Calif. 90808

[21] Appl. No.: 560,374

[22] Filed: Dec. 12, 1983

[51] Int. Cl.³ .............................................. H01M 2/12
[52] U.S. Cl. ........................................ 429/87; 429/121
[58] Field of Search ............................ 429/87, 89, 121

[56] References Cited

U.S. PATENT DOCUMENTS

| | | | |
|---|---|---|---|
| 2,570,123 | 10/1951 | Heine | 429/87 |
| 3,284,244 | 11/1966 | Lucas | 429/87 |
| 3,287,173 | 11/1966 | Cox et al. | 429/87 |
| 3,669,755 | 6/1972 | Hughes, Jr. | 429/87 |
| 3,943,008 | 3/1976 | Schaumburg | 429/87 |
| 4,214,045 | 7/1980 | Jutte et al. | 429/87 |

Primary Examiner—Anthony Skapars
Attorney, Agent, or Firm—William C. Babcock

[57] ABSTRACT

A quick release storage battery closure assembly for removably engaging the inspection opening defining bosses on a storage battery, the one that replaces the individual caps that normally are used for closing the inspection openings. The closure assembly is particularly adapted for use where the storage batteries are arranged as a group, such as on a golf cart or industrial vehicle.

10 Claims, 7 Drawing Figures

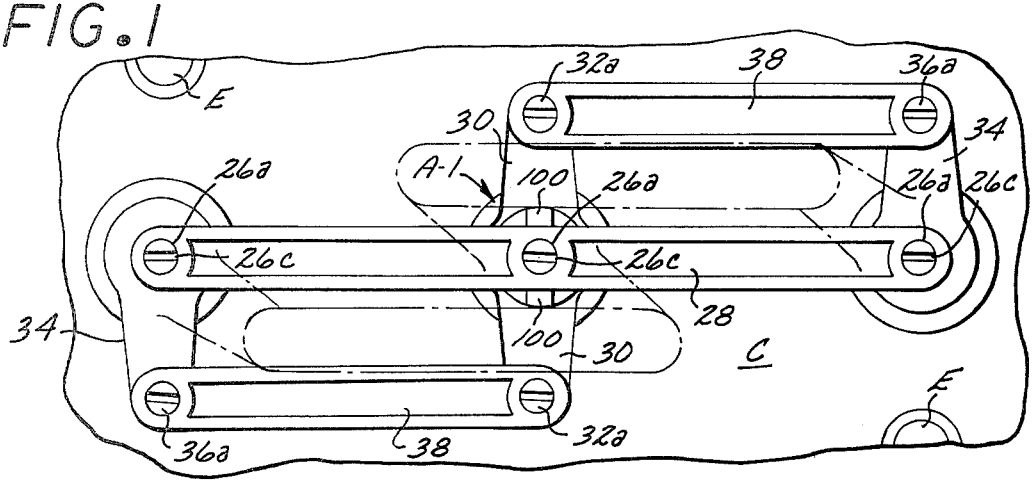
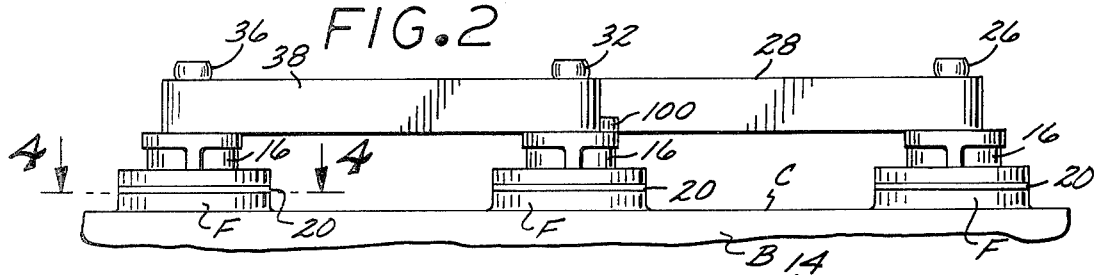
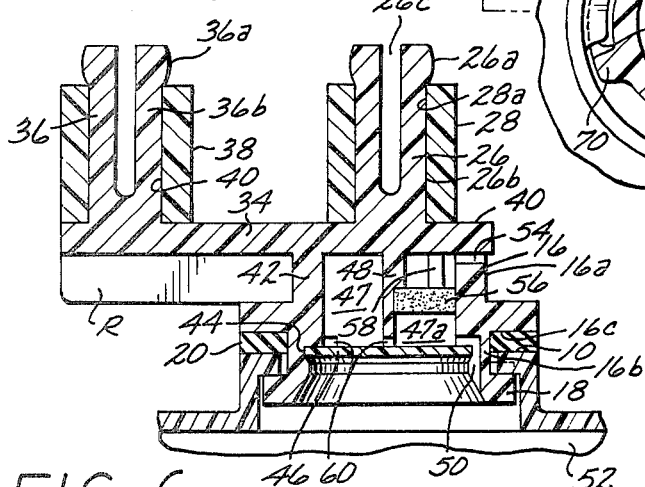
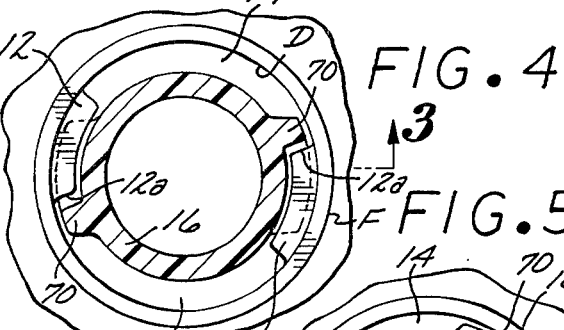
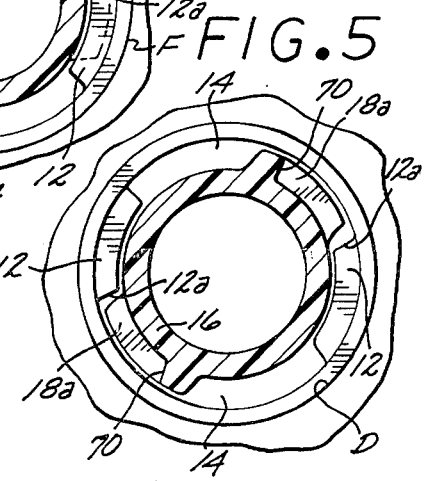
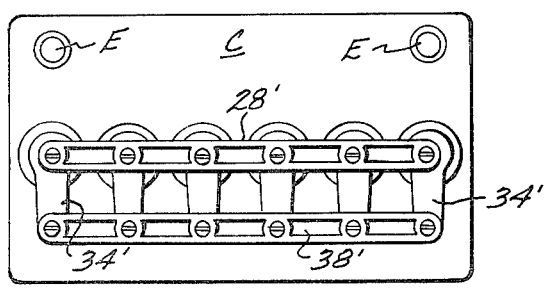
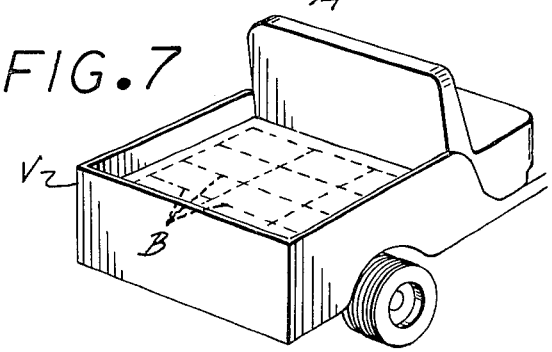

4,477,542

QUICK RELEASE STORAGE BATTERY CLOSURE ASSEMBLY

DESCRIPTION OF THE PRIOR ART

Electrically operated vehicles such as golf carts, and those used in industrial warehouses and manufacturing plants, have the power supplied thereto by storage batteries arranged in groups. Such batteries are expensive, and it is important to the owner or operator that the batteries be maintained properly. Maintenance of such storage batteries requires that the level of the electrolyte therein be checked periodically. Checking of the storage batteries requires that the individual closure caps on the inspection openings be removed one by one and then replaced, which is a tedious and time consuming operation.

A major object of the present invention is to provide a quick release battery closure assembly that will replace the individual closure caps on a storage battery, and one that may be disengaged from the battery with a single motion by the user to expose all of the inspection openings of the battery, and replaced in an engaging position by a single motion in an opposite direction.

A further object of the invention is to furnish a closure assembly of such design and structure that the major components thereof may be injection molded from a polymerized resin that is not adversely affected by the electrolyte used in the storage batteries.

Yet another object of the closure assembly is to furnish one that is simple and easy to use, requires little or no maintenance attention, may be assembled and repaired without the use of hand tools, and is sufficiently inexpensive to encourage the wide spread use thereof for its intended purpose.

These and other objects and advantages of the invention will become apparent from the following detailed description thereof.

SUMMARY OF THE INVENTION

The quick release storage battery closure assembly of the present invention is adapted for use on a multi-cell battery in which the inspection openings are axially aligned and defined by tubular upwardly extending cylindrical bosses, with each boss having a pair of circumferentially spaced lugs within the interior thereof.

The battery closure assembly includes a number of generally cylindrical bodies that are pivotally supported from an elongate rigid member and in such longitudinal spacing that they may be concurrently inserted in and removed from the inspection opening by a single movement of the assembly.

When the present invention is used the caps that normally close the inspection openings of the battery are discarded.

Each of the generally cylindrical bodies has a lower portion that extends into one of the bosses, and each lower portion including a pair of circumferentially spaced cam members that have downwardly extending tapered upward surfaces. When the generally cylindrical bodies are in a first position, the lower portions thereof are concurrently moved downwardly in the bosses to dispose the pairs of cam members below the pairs of circumferentially spaced lugs. The generally cylindrical bodies may now be pivotally concurrently to second positions in which each pair of cam members moves under an associated pair of lugs to interlock the closure assembly to the battery.

Pivoting of the generally cylindrical bodies to either the first or second position is achieved by one or more elongate rigid members that are pivotally connected to upwardly extending pins mounted on rigid arms that extend outwardly from the generally cylindrical bodies. The pins are of split structure with enlarged free ends to permit them to be pivotally and removably engaged by the openings in the elongate members. Accordingly, the repair of the closure assembly may be made without the use of hand tools. The components of the invention are of such design that they may be injection molded from a polymerized resin that is not adversely affected by the battery electrolyte.

BRIEF DESCRIPTION OF THE DRAWINGS

FIG. 1 is a top plan view of the first form of the closure assembly that was mounted on the top of a storage battery when in a first position shown in phantom line and then rotated clockwise to the second position shown in solid line where pairs of cam members of the assembly interlock with pairs of lugs defined within the inspection openings;

FIG. 2 is a side elevational view of the closure assembly shown in FIG. 1;

FIG. 3 is a vertical cross sectional view of one of the generally cylindrical bodies and actuating arms that form a part of the closure assembly and taken on the line 3—3 of FIG. 4;

FIG. 4 is a horizontal cross sectional view of one of the inspection opening defining bosses and the lower portion of one of the generally cylindrical bodies, and with the cam members on the generally cylindrical body being shown in engagement with a pair of lugs that extend inwardly in the inspection opening;

FIG. 5 is the same view as shown in FIG. 4, but after the generally cylindrical body has been rotated to a second position where the pair of cam members are disposed in circumferential spaces between the pair of lugs;

FIG. 6 is a second form of the closure assembly;

FIG. 7 is a perspective view of a golf cart indicating a group of storage batteries used in powering the same, with such an arrangement of batteries being one in which the present invention is particularly useful in the maintenance of the batteries.

DESCRIPTION OF THE PREFERRED EMBODIMENTS

A first form A-1 of the quick release storage battery closure assembly is shown in FIGS. 1 and 2 that is particularly useful on a group of storage batteries B, such as is used on a golf cart V as illustrated in FIG. 7. Each of the batteries B as may be seen in FIG. 2 has a top C, with the battery having three inspection openings D therein, and a pair of terminals E. Each of the inspection openings D is defined in the interior of a cylindrical boss F that extends upwardly from the top C, with each boss having a top ring shaped edge surface 10. Each of the bosses F has a pair of diametrically disposed lugs 12 extending inwardly towards one another from the interior of the boss as shown in FIGS. 4 and 5. Each pair of lugs 12 as may be seen in FIG. 5 is separated by a pair of circumferentially extending spaces 14.

The first form A-1 of the closure assembly includes three generally cylindrical bodies 16, one for each of the inspection openings D. Each of the bodies 16 includes an upper portion 16a and lower portion 16b. The lower portion 16b has a diameter slightly less than the diameter between a pair of lugs 12. Each lower portion 16b has a pair of oppositely disposed cam members 18 projecting therefrom, with each of the cam members having a downwardly tapered upper surface 18a.

Each of the cam members 18 is of a length slightly less than that of one of the circumferential spaces 14. Each of the bodies 16 at the junction between the upper and lower portions 16a and 16b defines a flat ring shaped body shoulder 16c. A resilient washer 20 encircles the lower portion 16b, and is abutting contact with the body shoulder 16c as shown in FIG. 3. Each body 16 is preferably of hollow construction, and has a confined space defined therein as shown in FIG. 3 which confined space is in communication with the interior of the battery B.

Each of the bodies 16 has a centered first pin of split construction extending upwardly therefrom as shown in FIG. 1 with each pin having an enlarged upper end 26a and a cylindrical section 26b situated therebelow. Each pin 26 has a slot 26c extending downwardly therein, which permits the two portions of the enlarged upper end 26a to be moved inwardly towards one another. This inward movement of the two portions defining the enlarged upper end 26a is possible due to pin 26 being formed of a resilient polymerized resin.

An elongate rigid alignment member 28 is provided, which has a number of longitudinally spaced, vertically extending openings 28a therein, each of which openings has a diameter slightly less than the diameter of the enlarged upper end 26a when the latter is in the position shown in FIG. 3.

The elongated alignment member 28 is caused to pivotally support the bodies 16, by the openings 28a being forced downwardly over the enlarged upper ends 26a to engage the sections 26b as shown in FIG. 3. The openings 28a are so longitudinally spaced that when one of the bodies 16 has the lower portion 16b extended downwardly into one of the inspection openings D, the balance of the bodies 16 will move downwardly concurrently into the other inspection openings.

The body 16 that engages the central one of the inspection openings D as shown in FIG. 1 has two first arms 30 that extend outwardly therefrom in opposite directions, with each of the arms at the outer extremity supporting an upwardly extending second vertical split pin 32. The bodies 16 that engage the pair of end inspection openings D as shown in FIG. 1 have second arms 34 extending outwardly therefrom in opposite directions, with each of the second arms having a third vertical split pin 36 extending upwardly therefrom. The second split pin 32 and the third vertical split pins 36 are of the same structure, with one of the third pins being shown in FIG. 3. The first and second arms 30 and 34 preferably include longitudinally extending reinforcing ribs R that depend therefrom, one of which is shown in FIG. 3.

Each third split pin 36 includes an enlarged upper end 36a that has a cylindrical section 36b therebelow. Two elongate rigid members 38 are provided that have transverse openings 40 in the ends thereof, with each of the members 38 pivotally engaging one of the second pins 32 and third pins 36 as shown in FIG. 1.

When the first form A-1 of the closure assembly is in the first position shown in phantom line in FIG. 1, the lower portions 16b of the bodies 16 can be moved downwardly into the inspection openings D. When the first arms 30 are pivoted towards the second position shown in solid line in FIG. 1, the rigid members 38 concurrently pivot the end positioned bodies 16 to the position as shown in solid line. As the bodies 16 so pivot in the bosses F, the cam members 18 move under the lugs 12, and due to the tapered upper surfaces 18a slidably contacting the under surface of the lugs 12, and the bodies 16 are forced downwardly to compress the washers 20 between the body shoulders 16c and the upper surfaces of the lugs 12. The first form A-1 of the invention is now in engagement with the battery B.

The first form A-1 of the closure assembly is disengaged from the battery B by reversing the above movement and lifting it from the inspection openings D to permit the level of the electrolyte in the battery B to be visually determined. After the inspection has been completed and the addition of water if necessary, the battery closure assembly A-1 is again mounted on the battery B in the first position as shown in phantom line in FIG. 1, and the pair of arms 30 used to pivot the central body 16 and end bodies 16 to the second position illustrated in solid line in that figure.

Gas is permitted to escape from the interior of the battery B and acid from inadvertently flowing therefrom by the structure of the body 16 shown in FIG. 3. The upper portion 16a of body 16 includes an end piece 40 from which a cylindrical side wall 42 extends downwardly and on the lower end portion supports the cam members 18. The interior surface of side wall 42 adjacent cam members 18 has a circumferentially extending recess 44 formed therein that is engaged by a circular resilient sheet 46 of an acid resistant material.

The sheet 46 and interior surfaces of side wall 42 and end piece 40 cooperate to define a confined space that is subdivided into a number of pre-shaped compartments 47 by a number of spaced partitions 48 that extend downwardly therein from the end piece to the sheet. A first of these compartments which is designated 47a in FIG. 3 is in communication with a vertically extending passage 50 formed in the side wall 42 and that communicates with the interior 52 of the battery B. A transverse vent passage 54 for gas is formed in the cylindrical side wall 42 adjacent the end piece 40. A porous body 56 of sintered polypropylene is positioned in compartment 47a a substantial distance below vent passage 54, which body allows gas from the battery to flow upwardly therethrough to escape to the ambient atmosphere through the vent passage.

The partitions 48 that define the compartment 47a have positive stops 58 formed therein above the body 56 to maintain the body 56 in a predetermined position. The partitions 48 have apertures 60 formed in the lower portion thereof through which acid on sheet 46 may flow by gravity to passage 50 and then back to the interior 52 of the battery B.

The first form of closure assembly A-1 is fully disposed in the second position shown in solid line in FIG. 1 when abutments 70 that project from the body 16 and are illustrated in FIGS. 4 and 5 contact end surfaces 12a of lugs 12.

An alternate form A-2 of the closure assembly is shown in FIG. 6 that is adapted to be used on a storage battery B that has six inspection opening defining bosses F' that are axially aligned and longitudinally spaced from one another. Each of the inspection openings is engaged by a body 16 of the structure shown in FIG. 3, and the bodies being pivotally connected and held in spaced relationship by a first rigid member 28', and the arms 34' being connected by a second elongate member 38'. The second form A-2 of the battery closure assembly operates in the same manner as the first form A-1 and accomplishes the same results.

The closure assembly A-1 preferably includes stops 100 as shown in FIGS. 1 and 2 that contact the alignment member 28 when the assembly is pivoted to the first position shown in phantom line in FIG. 1. The stops 100 prevent the assembly being pivoted beyond the first position above identified. Similar stops (not shown) may be included in the second form A-2 of the closure if desired.

The use and operation of the invention has been described previously in detail and need not be repeated.

What is claimed is:

1. In combination with a storage battery having a plurality of longitudinally spaced, upwardly extending cylindrical bosses that have upper edge surfaces and define a plurality of inspection openings, each of said bosses including a pair of lugs that extend inwardly towards one another and have a pair of circumferential spaces therebetween, a quick release closure assembly for said inspection openings said quick release closure assembly including:
   a. a plurality of generally cylindrical bodies, each of said bodies having an upper portion and a lower portion that at their junction define a flat ring shaped body shoulder, a pair of diametrically opposed cam members that extend outwardly from said lower portion and of such length as to be capable of being moved downwardly through said pair of circumferential spaces when said body is in a first position in one of said inspection openings, said pair of cam members having oppositely extending inclined upper edge surfaces;
   b. first means for maintaining said generally cylindrical bodies in such longitudinal spacing that said cylindrical bodies may be moved concurrently into or out of said inspection openings when said cylindrical bodies occupy said first position;
   c. a plurality of resilient washers that encircle said lower portions of said cylindrical bodies and abut against said body shoulders; and
   d. second means for concurrently rotating said generally cylindrical bodies to second positions from said first positions when said lower portions are in said inspection opening and said cam members at least partially below said lugs, with said inclined upper edge surfaces slidably engaging said lugs to removably interlock therewith and compress said washers to effect seals between said body shoulders and said upper edge surfaces of said bosses.

2. A quick release closure assembly as defined in claim 1 in which said first means includes:
   e. a plurality of first vertically disposed split pins that extend upwardly from said upper portions, said first split pins having enlarged upper ends and cylindrical sections therebelow; and
   f. an elongate first rigid member that has a plurality of longitudinally spaced transverse bores therein through which said enlarged upper ends are forced for said first elongate rigid member to be pivotally engaged by said cylindrical sections of said first pins.

3. A quick release closure assembly as defined in claim 2 in which said second means includes:
   g. a plurality of substantially parallel arms that extend outwardly from said upper portions of said bodies said arms having outer end portions;
   h. a plurality of second vertically disposed split pins that extend upwardly from said outer end portions, said second pins having enlarged upper ends and cylindrical sections therebelow; and
   i. an elongate second rigid member that has a plurality of longitudinally spaced transverse bores therein through which said enlarged ends are forced for said second elongate rigid member to be pivotally engaged by said cylindrical sections of said second pins.

4. A quick release closure assembly as defined in claim 3 in which each of said cylindrical bodies has a confined space defined therein that is in communication with the interior of said battery and a transverse vent passage in said cylindrical body, and said closure assembly further including:
   j. a body of porous acid resisting material disposed in said confined space that allows gas generated in said battery to flow upwardly therethrough to said vent passage to escape to the ambient atmosphere but prevents the free flow of acid from battery to said vent passage.

5. A quick release closure assembly as defined in claim 4 which in addition includes:
   k. stop means for preventing said plurality of cylindrical bodies from being rotated beyond said second positions.

6. A quick release closure assembly as defined in claim 1 for use on a storage battery having a central inspection opening and a pair of end inspection openings on opposite sides thereof, with said plurality of generally cylindrical bodies including a first generally cylindrical body and a pair of second generally cylindrical bodies, with each of said first and second generally cylindrical bodies having an upper portion and a lower portion that at their junction define a flat ring shaped body shoulder, a pair of diametrically opposed cam members that extend outwardly from said lower portion and of such length as to be capable of being moved downwardly through said circumferential spaces when said lower portion of said first generally cylindrical body is disposed in said central inspection space and said lower portions of said second generally cylindrical bodies are disposed in said pair of end inspection spaces, each of said pair of cam members having oppositely extending inclined upper edge surfaces, and said first means includes:
   e. a plurality of first vertically disposed split pins that extend upwardly from said upper portions of said first and second generally cylindrical bodies, said first split pins having enlarged upper ends and cylindrical sections therebelow; and
   f. an elongate first rigid member that has a plurality of longitudinally spaced transverse bores therein through which said enlarged upper ends are forced for said first elongate rigid member to be pivotally engaged by said cylindrical sections of said first pins.

7. A quick release closure assembly as defined in claim 6 in which said second means includes:
   g. a pair of first arms that extend outwardly in opposite directions from said upper portion of said first generally cylindrical body;

h. two second arms that extend outwardly in opposite directions from said upper portions of said second generally cylindrical bodies;
i. a pair of second pins that extend upwardly from said first pair of arms and two third pins that extend upwardly from said second arm, both said second and third pins being vertically split and having enlarged upper ends and cylindrical sections therebelow; and
j. a pair of elongate second rigid members, each of said second elongate members having first and second longitudinally spaced transverse bores therein through which said enlarged upper ends are forced, for said first transverse bores to pivotally engage said second pins and said second transverse bores said third pins.

8. A quick release closure assembly as defined in claim 1 in which the components thereof are defined by a battery electrolyte resistant polymerized resin.

9. A quick release closure assembly as defined in claim 7 that in addition includes:
k. stop means for preventing said battery closure assembly from pivoting beyond said second position.

10. A quick release closure assembly as defined in claim 4 which in addition includes:
k. third means for preventing said battery closure assembly from being pivoted beyond said first position.

* * * * *